(12) United States Patent
Gill et al.

(10) Patent No.: US 9,230,576 B1
(45) Date of Patent: Jan. 5, 2016

(54) SCISSOR READER WITH SIDE SHIELD DECOUPLED FROM BIAS MATERIAL

(71) Applicant: HGST Netherlands B.V., Amsterdam (NL)

(72) Inventors: Hardayal Singh Gill, Palo Alto, CA (US); Shiwen Huang, Fremont, CA (US); Quang Le, San Jose, CA (US); Guangli Liu, Pleasanton, CA (US); Xiaoyong Liu, San Jose, CA (US); Suping Song, Fremont, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/479,767

(22) Filed: Sep. 8, 2014

(51) Int. Cl.
*G11B 5/39* (2006.01)
*G11B 5/31* (2006.01)
*G11B 5/11* (2006.01)

(52) U.S. Cl.
CPC ............ *G11B 5/3912* (2013.01); *G11B 5/3146* (2013.01); *G11B 5/39* (2013.01); *G11B 5/3932* (2013.01); *G11B 5/11* (2013.01); *G11B 2005/3996* (2013.01)

(58) Field of Classification Search
CPC .......... G11B 5/11; G11B 5/3146; G11B 5/39; G11B 5/3912
USPC ............ 360/319, 320, 324.1, 324.11, 324.12, 360/324.2
See application file for complete search history.

(56) References Cited

U.S. PATENT DOCUMENTS

| | | | | |
|---|---|---|---|---|
| 7,808,750 | B2 * | 10/2010 | Yanagisawa et al. | 360/324.12 |
| 8,015,694 | B2 | 9/2011 | Carey et al. | |
| 8,144,437 | B2 * | 3/2012 | Miyauchi et al. | 360/324.12 |
| 8,233,247 | B2 | 7/2012 | Carey et al. | |
| 8,390,963 | B2 | 3/2013 | Dimitrov et al. | |
| 8,514,525 | B2 * | 8/2013 | Childress et al. | 360/319 |
| 8,559,140 | B2 * | 10/2013 | Gao | 360/324.12 |
| 8,582,247 | B2 | 11/2013 | Song et al. | |
| 8,724,265 | B2 * | 5/2014 | Qiu et al. | 360/324.12 |
| 8,780,508 | B2 * | 7/2014 | Dimitrov et al. | 360/324.12 |
| 8,837,092 | B2 * | 9/2014 | Covington et al. | 360/324 |
| 8,873,203 | B2 * | 10/2014 | Hoshino et al. | 360/319 |
| 8,891,208 | B2 * | 11/2014 | Degawa et al. | 360/319 |
| 2009/0034132 | A1 * | 2/2009 | Miyauchi et al. | 360/324 |
| 2011/0007426 | A1 | 1/2011 | Qiu et al. | |
| 2012/0281319 | A1 * | 11/2012 | Singleton et al. | 360/319 |
| 2013/0095349 | A1 | 4/2013 | Van Dorn et al. | |
| 2014/0104729 | A1 * | 4/2014 | Singleton et al. | 360/319 |
| 2014/0340793 | A1 * | 11/2014 | Song et al. | 360/319 |

OTHER PUBLICATIONS

Masayuki Takagishi, st al.; "Magnetoresistance Ratio and Resistance Area Design of CPP-MR Film for 2-5 Tb/in2 Read Sensors"; IEEE Transactions on Magnetics; vol. 46, No. 6, Jun. 2010; 4 pages.

* cited by examiner

*Primary Examiner* — Jefferson Evans
(74) *Attorney, Agent, or Firm* — Patterson & Sheridan, LLP

(57) ABSTRACT

Embodiments disclosed herein generally relate to a magnetic head having a sensor stack and a bias material that is aligned in a direction perpendicular to a media facing surface. The sensor stack and a first portion of the bias material are laterally bookended by synthetic antiferromagnetic (SAF) structures, and a second portion of the bias material is laterally bookended by a dielectric material. In this configuration, the SAF structures are decoupled from the bias material, which minimizes the disturbance to the bias material.

8 Claims, 15 Drawing Sheets

SCISSOR READER WITH SIDE SHIELD DECOUPLED FROM BIAS MATERIAL

BACKGROUND

1. Field

Embodiments disclosed herein generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected tracks on the rotating disk. The suspension arm biases the slider towards the surface of the disk when the disk is not rotating but, when the disk rotates, air is swirled by the rotating disk adjacent a media facing surface (MFS), such as an air bearing surface (ABS) of the slider, causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

One type of conventional sensor used in the read head is a scissor sensor. The scissor sensor stack typically has two free magnetic layers with magnetizations that move in a scissor fashion relative to each other. The scissor sensor stack has a first surface located at the MFS and a second surface opposite the first surface and a bias material is typically disposed adjacent the second surface of the sensor stack. Side shields, such as synthetic antiferromagnetic (SAF) structures, typically laterally bookend the sensor stack and the bias material. The side shields minimize the demagnetization energy of the dual free layer. However, in this configuration, strong interaction between the SAF structures and the bias material can occur, such that the stray field from the SAF structures disturbs bias material stabilization.

Therefore, an improved read head is needed.

SUMMARY

Embodiments disclosed herein generally relate to a magnetic head having a sensor stack and a bias material that is aligned in a direction perpendicular to a MFS. The sensor stack and a first portion of the bias material are laterally bookended by SAF structures, and a second portion of the bias material is laterally bookended by a dielectric material. In this configuration, the SAF structures are decoupled from the bias material, which minimizes the disturbance to the bias material.

In one embodiment, a magnetic head is disclosed. The magnetic head includes a sensor stack and a bias material. The bias material is aligned with the sensor stack in a direction that is substantially perpendicular to a media facing surface. The magnetic head further includes side shields laterally bookending the sensor stack and a first portion of the bias material. The side shields extend to the media facing surface. The magnetic head further includes a dielectric material laterally bookending a second portion of the bias material, and the dielectric material is recessed from the media facing surface.

In another embodiment, a magnetic head is disclosed. The magnetic head includes a sensor stack and side shields laterally bookending the sensor stack. The side shields extend to a media facing surface. The magnetic head further includes a first multilayer shield disposed under the sensor stack and the side shields, a sensor shield disposed under the first multilayer shield, and a second multilayer shield disposed over the sensor stack and the side shields.

In another embodiment, a magnetic head is disclosed. The magnetic head includes a sensor stack and a dielectric material laterally bookending the sensor stack. The dielectric material extends to a media facing surface. The magnetic head further includes a first multilayer shield disposed under the sensor stack and the dielectric material, a sensor shield disposed under the first multilayer shield, and a second multilayer shield disposed over the sensor stack and the dielectric material.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field involving magnetic sensors.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s).

Embodiments disclosed herein generally relate to a magnetic head having a sensor stack and a bias material that is aligned in a direction perpendicular to a MFS. The sensor stack and a first portion of the bias material are laterally bookended by SAF structures, and a second portion of the bias material is laterally bookended by a dielectric material. In this configuration, the SAF structures are decoupled from the bias material, which minimizes the disturbance to the bias material.

Figure 1:
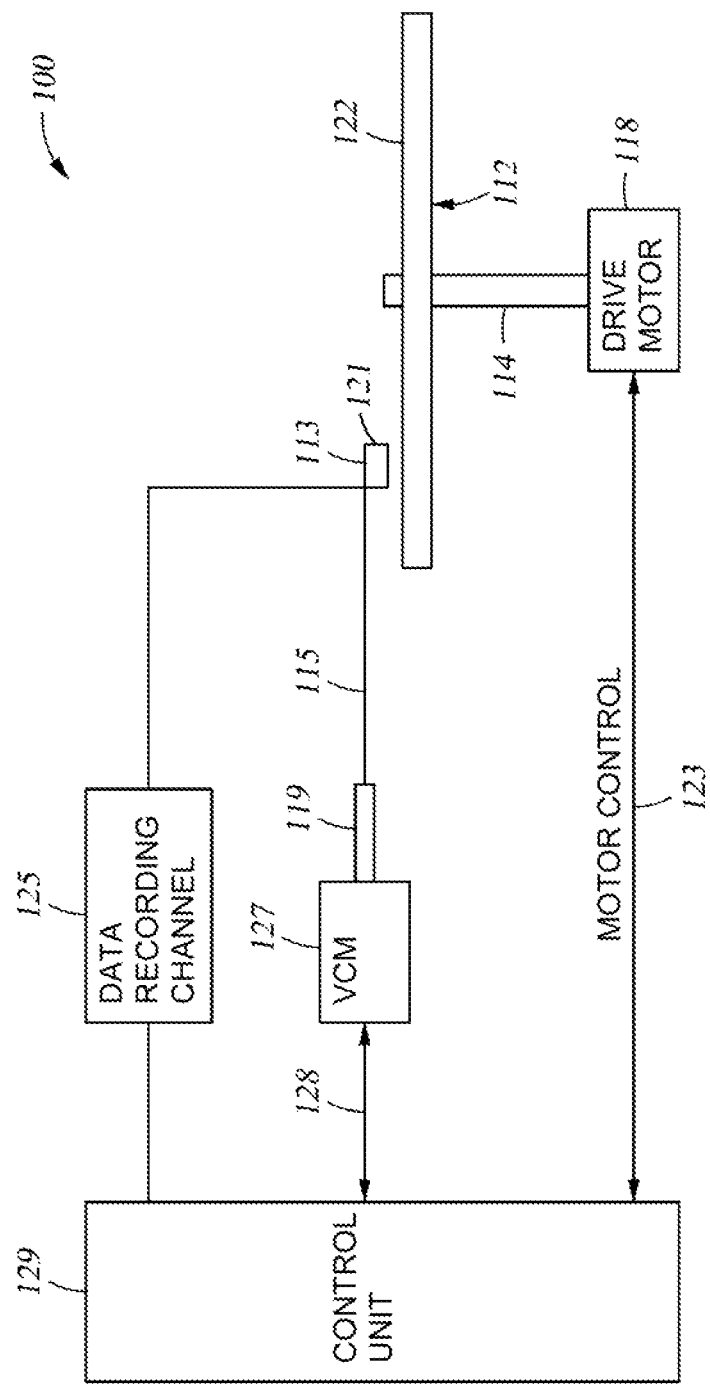
FIG. 1 illustrates a disk drive system according to embodiments described herein.

FIG. 1 illustrates a disk drive 100 according to one embodiment disclosed herein. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic disk rotates, the slider 113 moves radially in and out over the disk surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 towards the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the disk surface 122 which exerts an upward force or lift on the slider 113. The air bearing thus counterbalances the slight spring force of suspension 115 and supports slider 113 off and slightly above the media 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
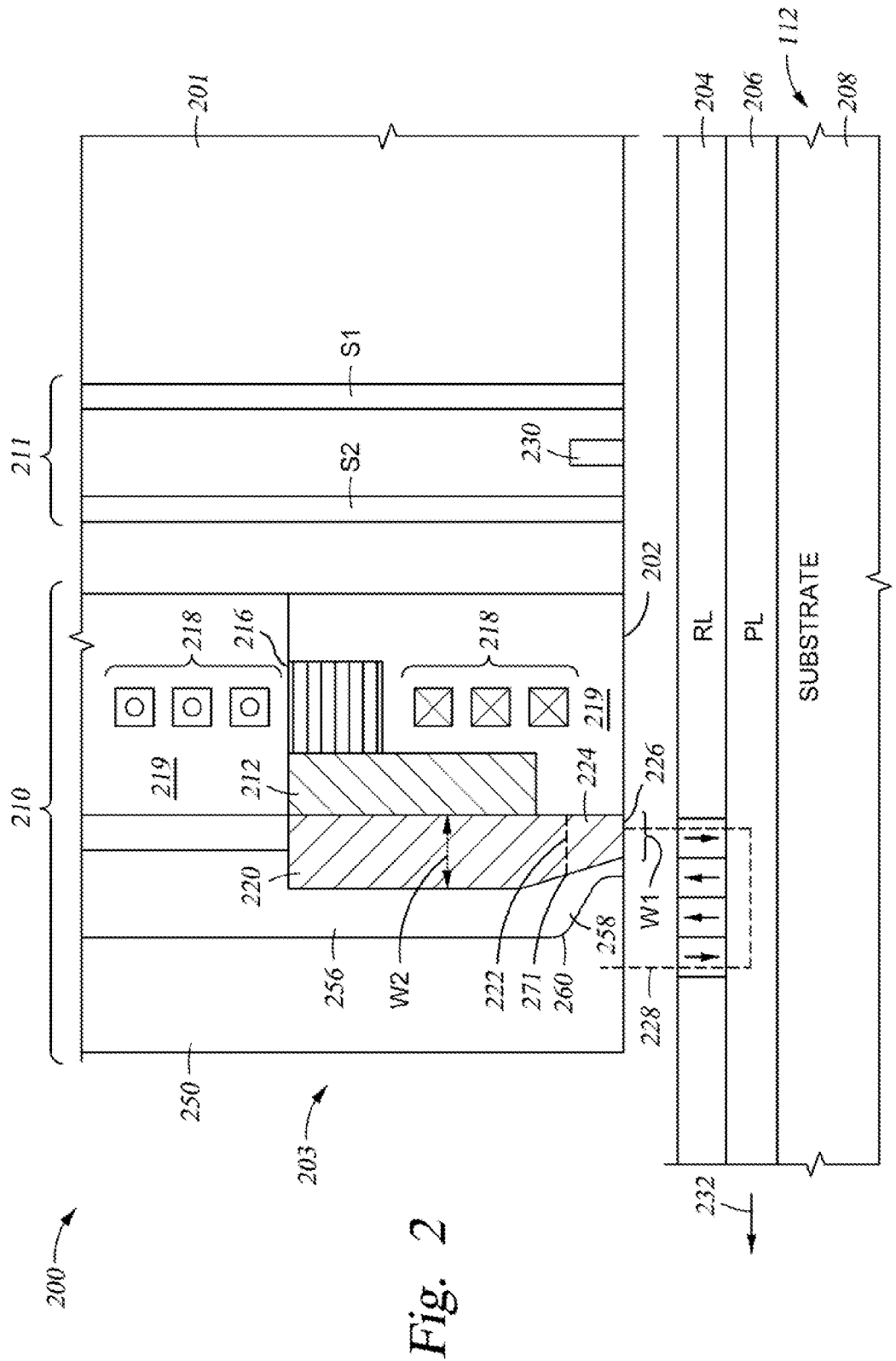
FIG. 2 is a cross sectional side view of a read/write head and magnetic disk of the disk drive of FIG. 1 according to embodiments described herein.

FIG. 2 is a fragmented, cross sectional side view through the center of a read/write head 200 mounted on a slider 201 and facing magnetic media 112. The slider 201 may be the slider 113. In some embodiments, the magnetic media 112 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes a MFS 202, a magnetic write head 210 and a magnetic read head 211, and is mounted such that the MFS 202 is facing the magnetic media 112. In FIG. 2, the media 112 moves past the write head 210 in the direction indicated by the arrow 232, so the portion of the read/write head 200 that is opposite the slider 201 is often called the "trailing" end 203.

In some embodiments, the magnetic read head 211 may include a sensing element 230 located between sensor shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the sensing element 230 as the recorded bits.

The write head 210 includes a magnetic circuit made up of a main pole 212 and a yoke 216. The write head 210 also includes a thin film coil 218 shown in the section embedded in nonmagnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the MFS 202 of the magnetic write head 210 facing the outer surface of media 112.

Write pole 220 may be a flared write pole and may include a flare point 222 and a pole tip 224 that includes the end 226. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the MFS 202 to a second width W2 away from the MFS 202. In one embodiment, the width W1 may be between around 60 nm and 200 nm, and the width W2 may be between around 120 nm and 350 nm. While the tapered region 271 is shown with a single straight surface in FIG. 2, in alternative embodiments, the tapered region 271 may include a plurality of tapered surfaces with different taper angles with respect to the MFS 202.

The tapering improves magnetic performance. For example, reducing the width W1 at the MFS 202 may concentrate a magnetic field generated by the write pole 220 over portions of the magnetic media 112. In other words, reducing the width W1 of the write pole 220 at the MFS 202 reduces the probability that tracks adjacent to a specified track are erroneously altered during writing operations.

In operation, write current passes through the coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to specified regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the MFS 202, the nonmagnetic gap layer 256 has a reduced thickness and forms a shield gap throat 258. The throat gap width is generally defined as the distance between the write pole 220 and the magnetic shield 250 at the MFS 202. The shield 250 is formed of magnetically permeable material (such as Ni, Co and Fe alloys) and the gap layer 256 is formed of nonmagnetic material (such as Ta, TaO, Ru, Rh, NiCr, SiC or $Al_2O_3$). A taper 260 in the gap material provides a gradual transition from the throat gap width at the MFS 202 to a maximum gap width above the taper 260. This gradual transition in width forms a tapered bump in the nonmagnetic gap layer 256 that allows for greater magnetic flux density from the write pole 220, while avoiding saturation of the shield 250.

Figure 3A:
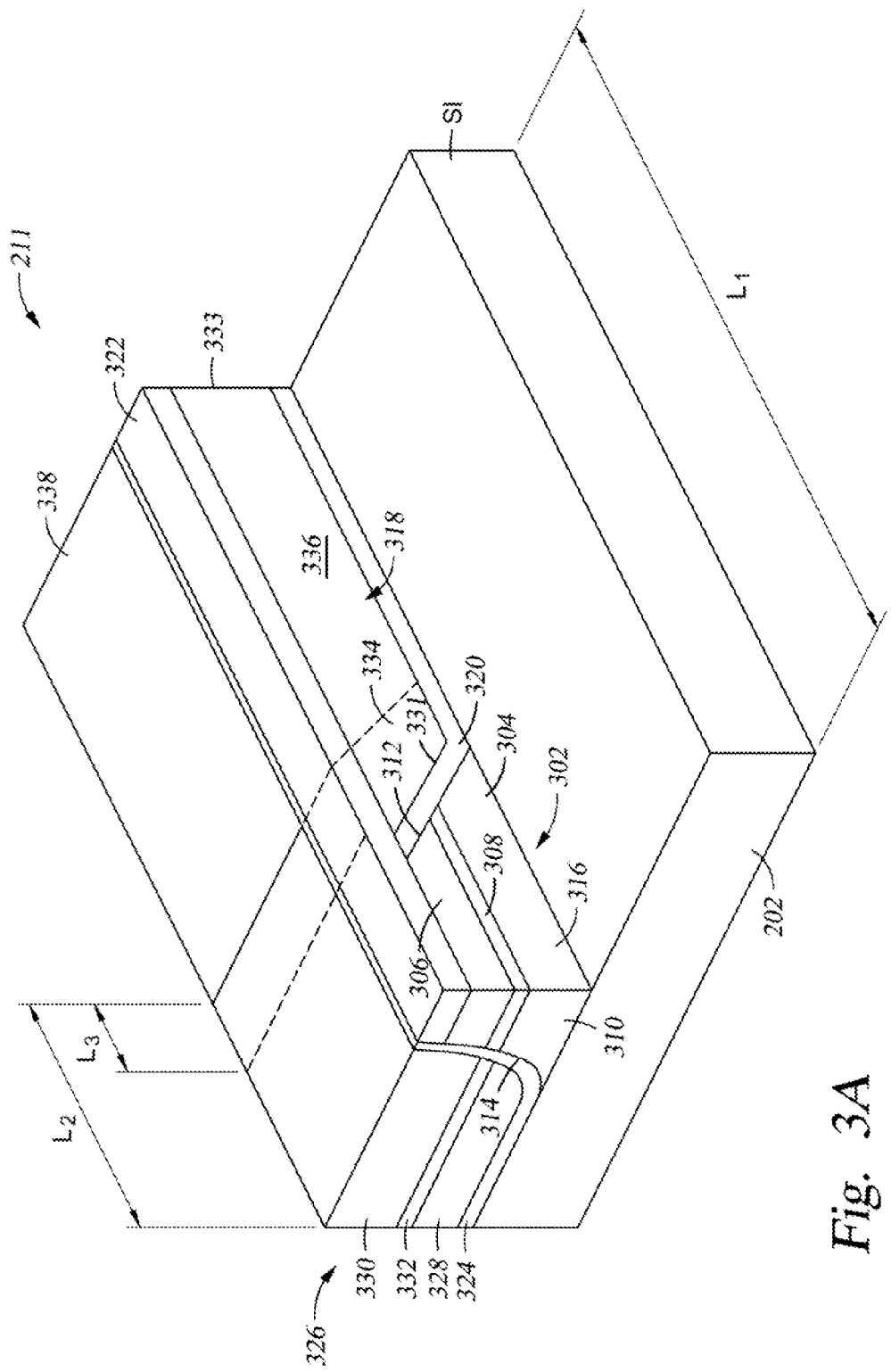
FIG. 3A is a perspective view of a portion of a magnetic read head according to embodiments described herein.

FIG. 3A is a perspective view of a portion of the magnetic read head 211 according to embodiments described herein. The magnetic read head 211 may include a sensor stack 302 disposed over the sensor shield S1. The sensor stack 302 may include a first magnetic free layer 304, a second magnetic free layer 306 and a nonmagnetic layer 308 sandwiched between the first and second magnetic free layers 304, 306. The first and second magnetic layers 304, 306 may each comprise a ferromagnetic material such as CoFe or NiFe, and the nonmagnetic layer 308 may comprise an electrically insulating material such as MgO for a tunnel junction sensor, or an electrically conductive material such as Cu, Ag, or AgSn for a giant magnetoresistive sensor. An optional seed layer (not shown) may be disposed between the sensor stack 302 and the sensor shield S1. The sensor stack 302 may have a first surface 310 that is a part of the MFS 202, a second surface 312 that is opposite the first surface 310, and lateral surfaces 314 (one lateral surface 314 is removed for clarity, so a cross sectional surface 316 is shown).

A nonmagnetic dielectric layer 320, such as an alumina, MgO, $Si_xN_y$, or $SiO_xN_y$ layer, may be disposed on the second surface 312. A bias material 318 may be disposed adjacent the nonmagnetic dielectric layer 320. The bias material 318 may be a hard bias material or a soft bias material, providing a magnetic bias field to overcome the magnetic anisotropy of the magnetic free layers 304, 306 to keep the magnetizations substantially perpendicular to one another. The bias material 318 may have a first surface 331 adjacent the nonmagnetic dielectric layer 320 and a second surface 333 opposite the first surface 331. The bias material 318 may be aligned with the sensor stack 302 in a direction that is substantially perpendicular to the MFS 202. The second surface 333 may be at a location that is a distance "L1" away from the MFS 202. A capping layer 322 may be disposed over the sensor stack 302, the nonmagnetic dielectric layer 320 and the bias material 318. The capping layer 322 may be a multilayer structure including Ru and Ta layers, Ir or Cr/Ir layers, or a Ru layer. Insulating layers 324 (only one shown), such as SiN, alumina, or MgO, may be disposed on the lateral surfaces 314 and the sensor shield Sl, and a side shield 326 may be disposed adjacent each insulating layer 324. The side shields 326 may extend to the MFS 202. The side shield 326 may be an SAF structure having a first magnetic layer 328, a second magnetic layer 330 and a nonmagnetic layer 332 disposed between the first and second magnetic layers 328, 330. The first and second magnetic layers 328, 330 may each comprise NiFe, CoFe, or alloys thereof and the nonmagnetic layer 332 may comprise Ru. Conventionally, the side shields extend from the MFS 202 to a location that is a distance "L1" away from the MFS 202, so the side shields are substantially parallel to the entire bias material 318, causing a disturbance to the bias material 318. In other words, the sensor stack 302 and the entire bias material 318 are laterally bookended by the conventional side shields.

To minimize the disturbance to the bias material 318, the height of the side shields 326 is reduced such that the side shields 326 extend from the MFS 202 to a location that is a distance "L2" away from the MFS 202. The distance "L2" may range from about 15 nm to about 100 nm. With this configuration, the sensor stack 302 and a portion 334 of the bias material 318 are laterally bookended by the side shields 326. The remaining portion 336 of the bias material 318 may be laterally bookended by a dielectric material 338, such as $TaO_x$ or alumina. The dielectric material 338 may be recessed from the MFS 202. The side shields 326 may be aligned with the dielectric material 338 in the direction that is substantially perpendicular to the MFS 202. The portion 334 of the bias material 318 may have a height "L3" that ranges from about 1 nm to about 40 nm.

Figure 3B:
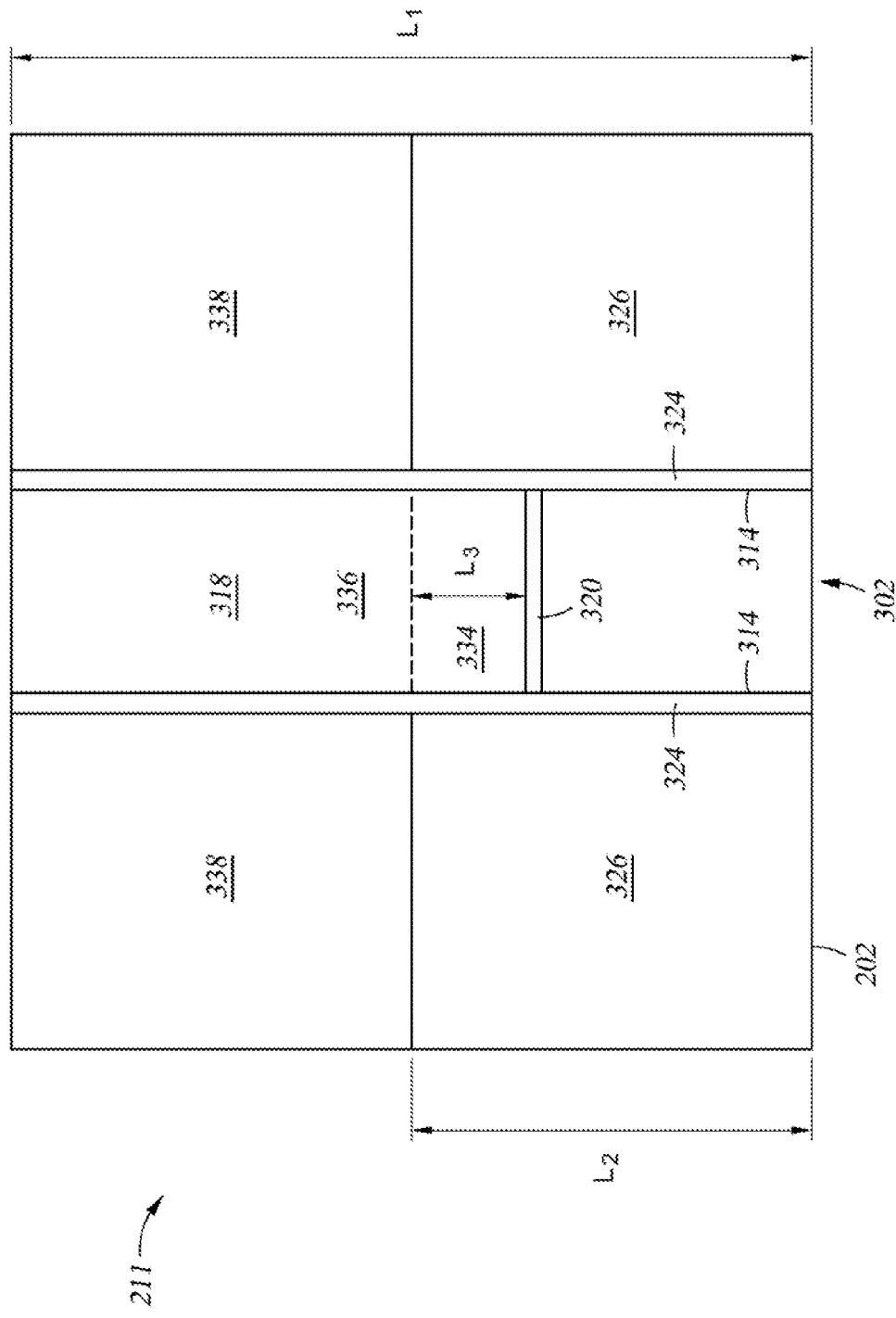
FIG. 3B is a cross sectional top view of the magnetic read head according to embodiments described herein.

FIG. 3B is a cross sectional top view of the magnetic read head 211 according to embodiments described herein. As shown in FIG. 3B, insulating layers 324 is disposed adjacent lateral surfaces 314 of the sensor stack 302 and the side shields 326 are disposed adjacent the insulating layers 324. The side shields 326 laterally bookend the sensor stack 302 and the first portion 334 of the bias material 318 and the dielectric material 338 laterally bookend the second portion 336 of the bias material 318.

Figure 4A:
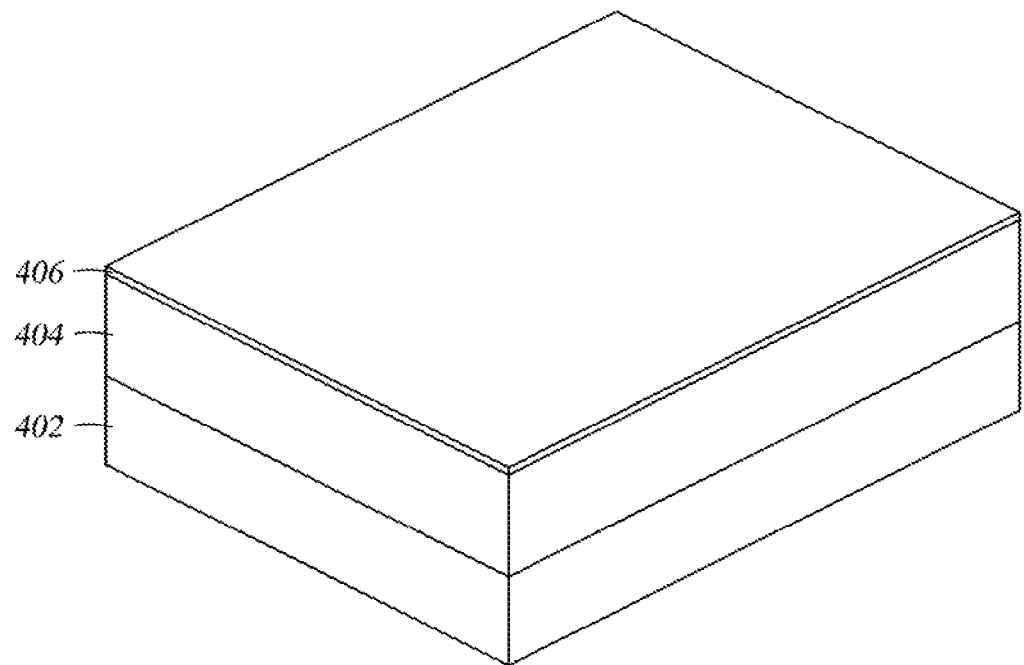
FIGS. 4A-4I illustrate process steps for forming the magnetic read head according to embodiments described herein.
Figure 4B:
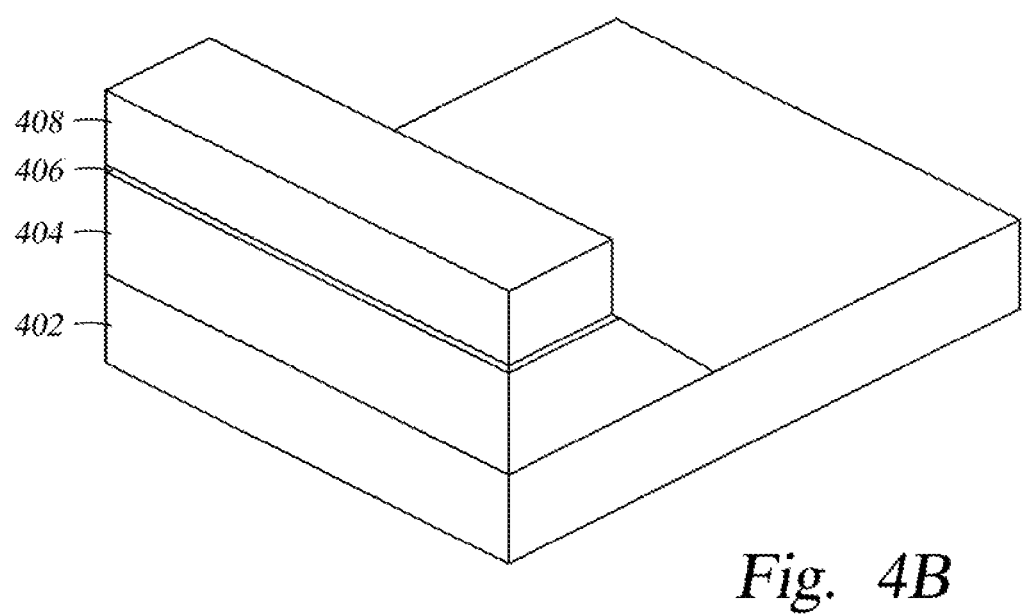

FIGS. 4A-4I illustrate process steps for forming the magnetic read head 211 according to embodiments described herein. As shown in FIG. 4A, a series of sensor layers 404 is deposited on a shield 402. The shield 402 may be the shield Si shown in FIG. 3A. The series of sensor layers 404 may include layers of the sensor stack 302 described above with reference to FIG. 3A. A layer 406 that is resistant to chemical mechanical polishing (CMP) such as a diamond like carbon (DLC) or amorphous carbon layer may be disposed on the series of sensor layers 404. Next, as shown in FIG. 4B, a mask structure 408 is disposed on a first portion of the layer 406, and a second portion of the layer 406 and the portion of the series of sensor layers 404 under the second portion of the layer 406 not covered by the mask structure 408 are removed, exposing a portion of the shield 402. The removing of the portion of the series of sensor layers is also known as defining stripe height, and may be performed by ion milling. The mask structure 408 may include various layers such as a hard mask layer that is resistant to CMP, an image transfer layer made of a DURIMIDE®, an antireflective coating layer, and a photoresist layer.

Figure 4C:
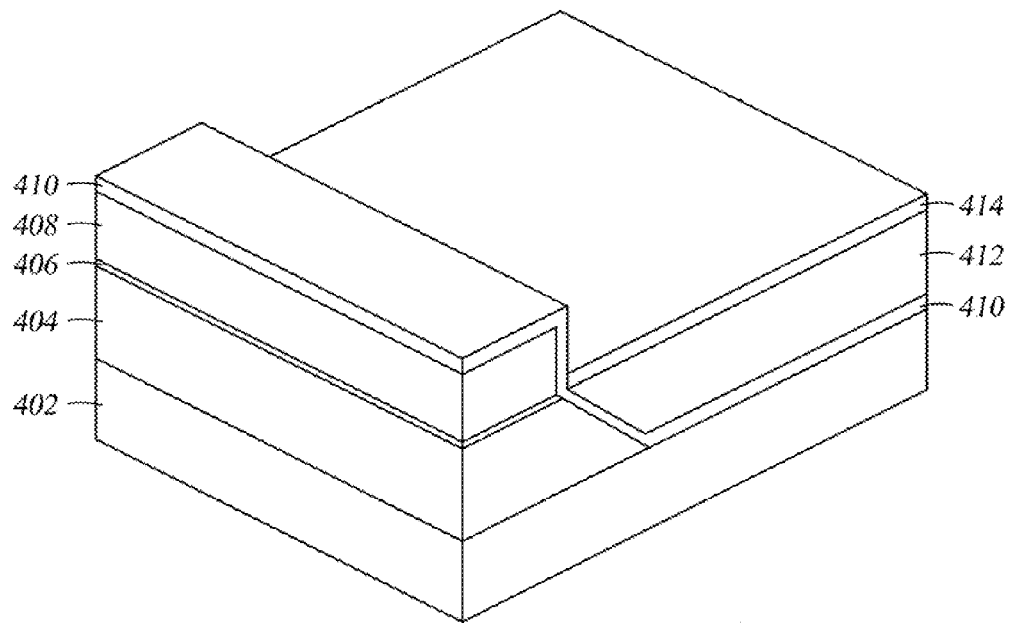

As shown in FIG. 4C, a nonmagnetic insulating layer 410 is deposited on the mask structure 408, the side wall of the remaining portion of the layer 406 and the series of sensor layers 404, and the exposed portion of the shield 402. The nonmagnetic insulating layer 410 may comprise the same material as the nonmagnetic insulating layer 320. A bias material 412 is deposited on a portion of the nonmagnetic insulating layer 410 that is disposed on the shield 402. The bias material 412 may comprise the same material as the bias material 318. A CMP stop layer 414 may be disposed on the bias material 412.

Figure 4D:
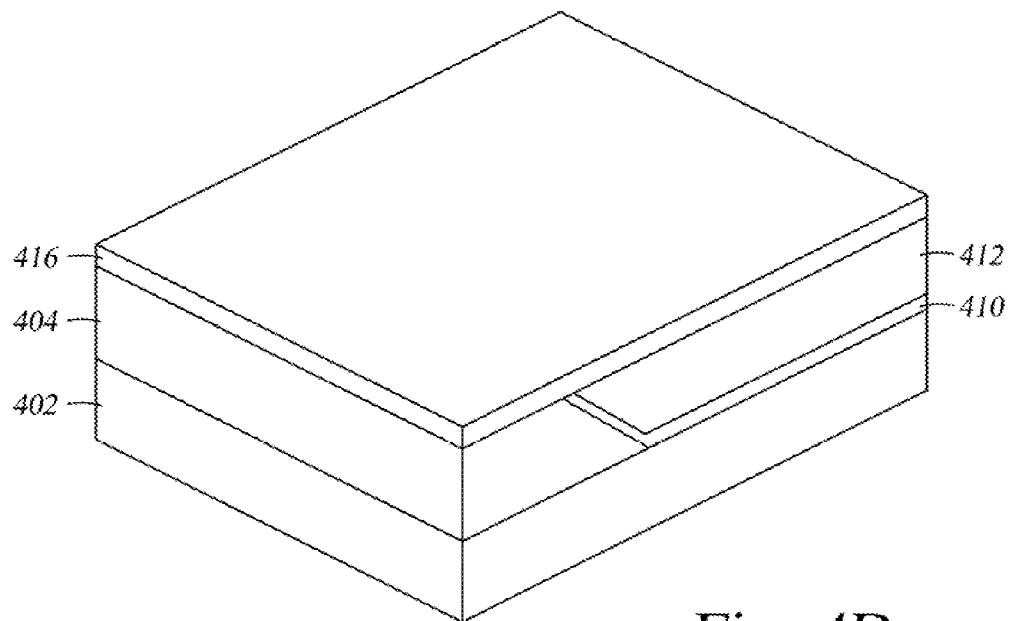

Next, as shown in FIG. 4D, the mask structure 408 and the portion of the nonmagnetic insulating layer 410 disposed over the mask structure 408 are removed using a CMP process. Then the CMP stop layers 406, 414 are removed using a reactive ion etching (RIE) process, and a nonmagnetic metallic layer 416, such as a Ru layer, may be deposited over the remaining portion of the series of sensor layers 404 and the bias material 412.

Figure 4E:
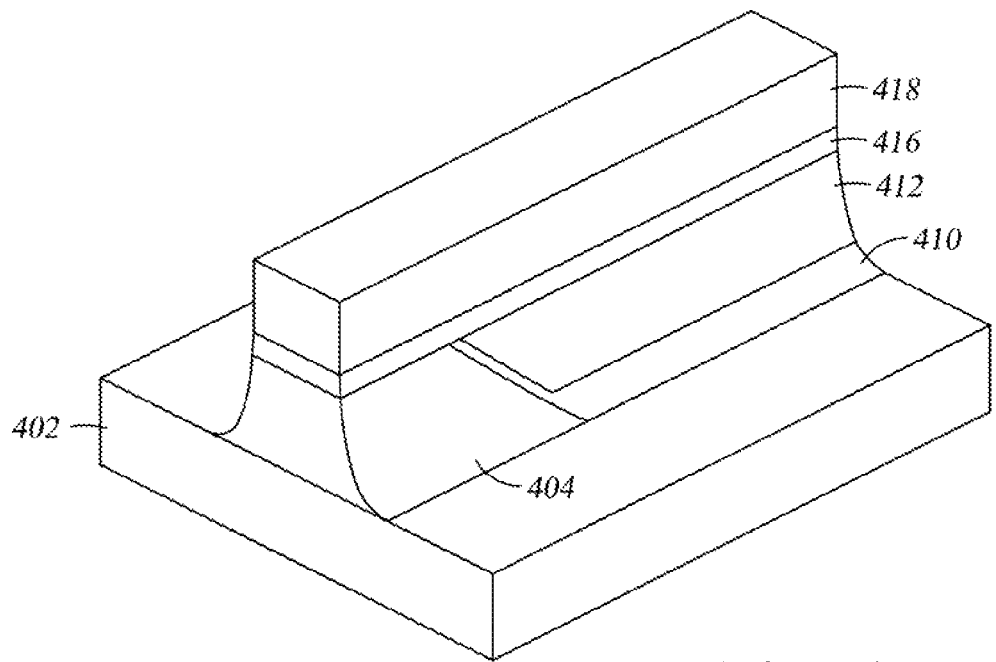

A mask structure 418 is disposed on a portion of the nonmagnetic metallic layer 416, as shown in FIG. 4E. The mask structure 418 may comprise the same material as the mask structure 408. Next, portions of the nonmagnetic metallic layer 416, the series of sensor layers 404, the nonmagnetic insulating layer 410, and the bias material 412 not covered by the mask structure 418 are removed, exposing portions of the shield 402. This step is also known as the track width defining step, and the resulting portion of the series of sensor layers 404 may be the sensor stack 302.

Figure 4F:
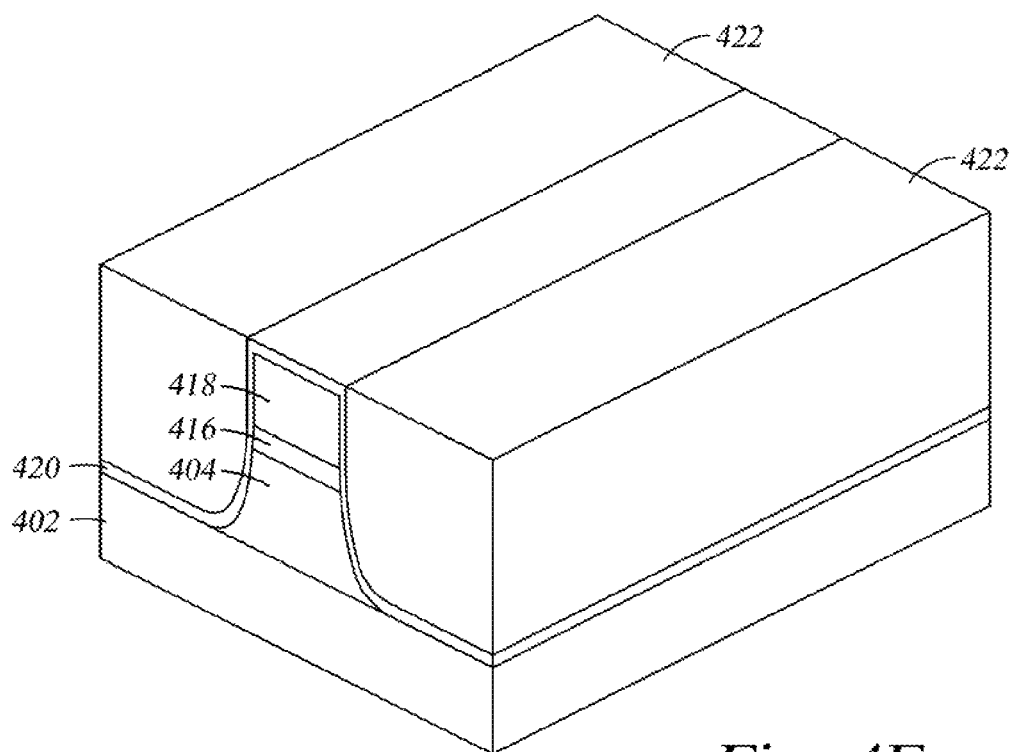
Figure 4G:
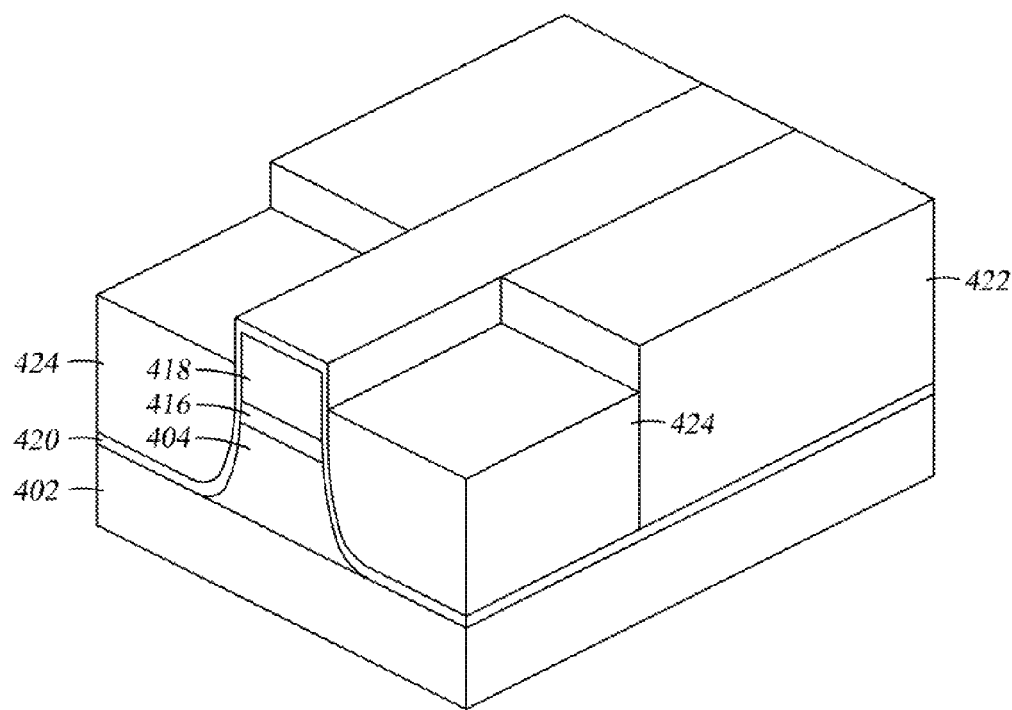

Next, as shown in FIG. 4F, an insulating layer 420 is deposited over the mask structure 418, the side walls of the portion of the series of sensor layers 404, and the exposed portions of the shield 402. The insulating layer 420 may comprise the same material as the insulating layer 324 shown in FIG. 3A. A photoresist 422 may be deposited over portions of the insulating layer 420 that are disposed over the exposed portions of the shield 402. Portions of the photoresist 422 may be removed by photolithography, and a structure 424 may be deposited on the insulating layer 420, bookending the portion of the series of sensor layers 404, as shown in FIG. 4G. The structure 424 may include the layers that are in the side shields 326. The removal of the portions of the photoresist 422 is to define the back edge of the structure 424.

Figure 4H:
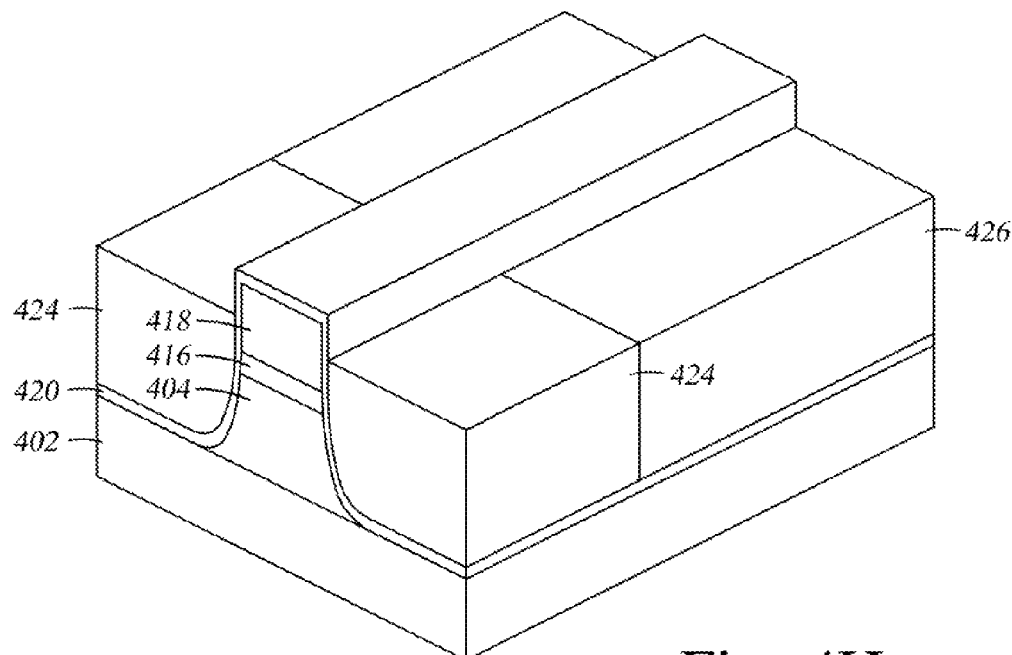
Figure 4I:
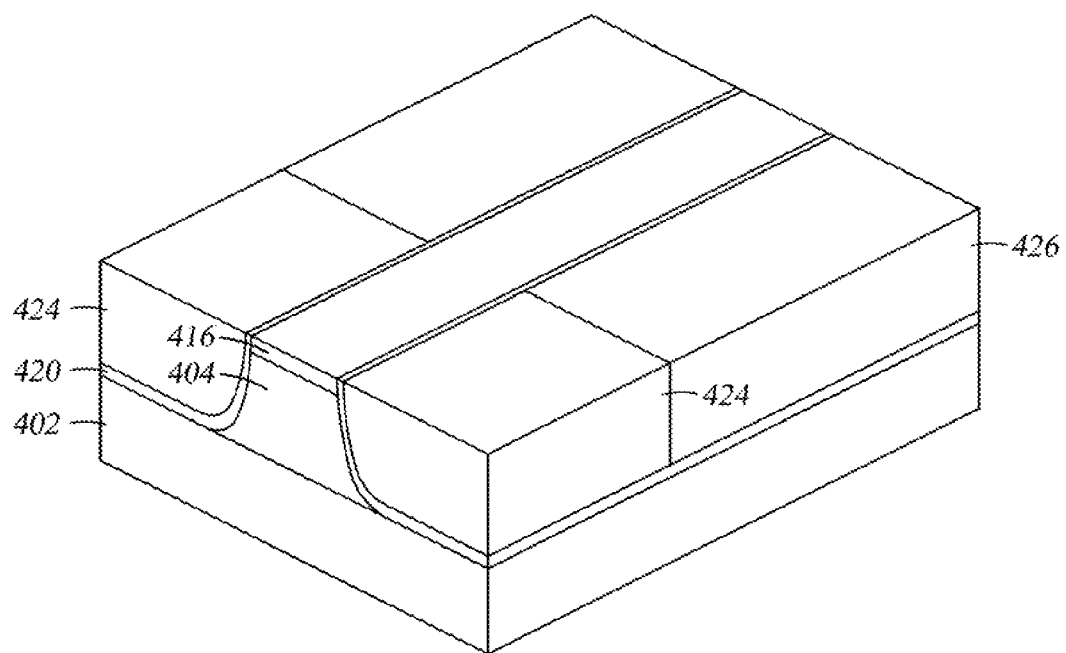

Next, as shown in FIG. 4H, the remaining portions of the photoresist 422 are removed and replaced by a dielectric material 426. The dielectric material 426 may bookend the bias material 412. The dielectric material may comprise the same material as the dielectric material 338. The mask structure 418 and the portion of the insulating layer 420 disposed on the mask structure 418 are removed by a CMP process. The CMP process also removes portions of the structure 424 and dielectric material 426, so the top surfaces of the structure 424, the nonmagnetic metallic layer 416 and the dielectric material 426 may be co-planar as shown in FIG. 4I. The series of sensor layers 404 and the bias material 412 are disposed under the nonmagnetic metallic layer 416, thus the series of sensor layers 404 and the bias material 412 are separated from any layers formed on the structure. The structure 424, now side shields, may be coupled to any layers formed on the structure, such as a top laminated shield which is described in detail below.

Figure 5:
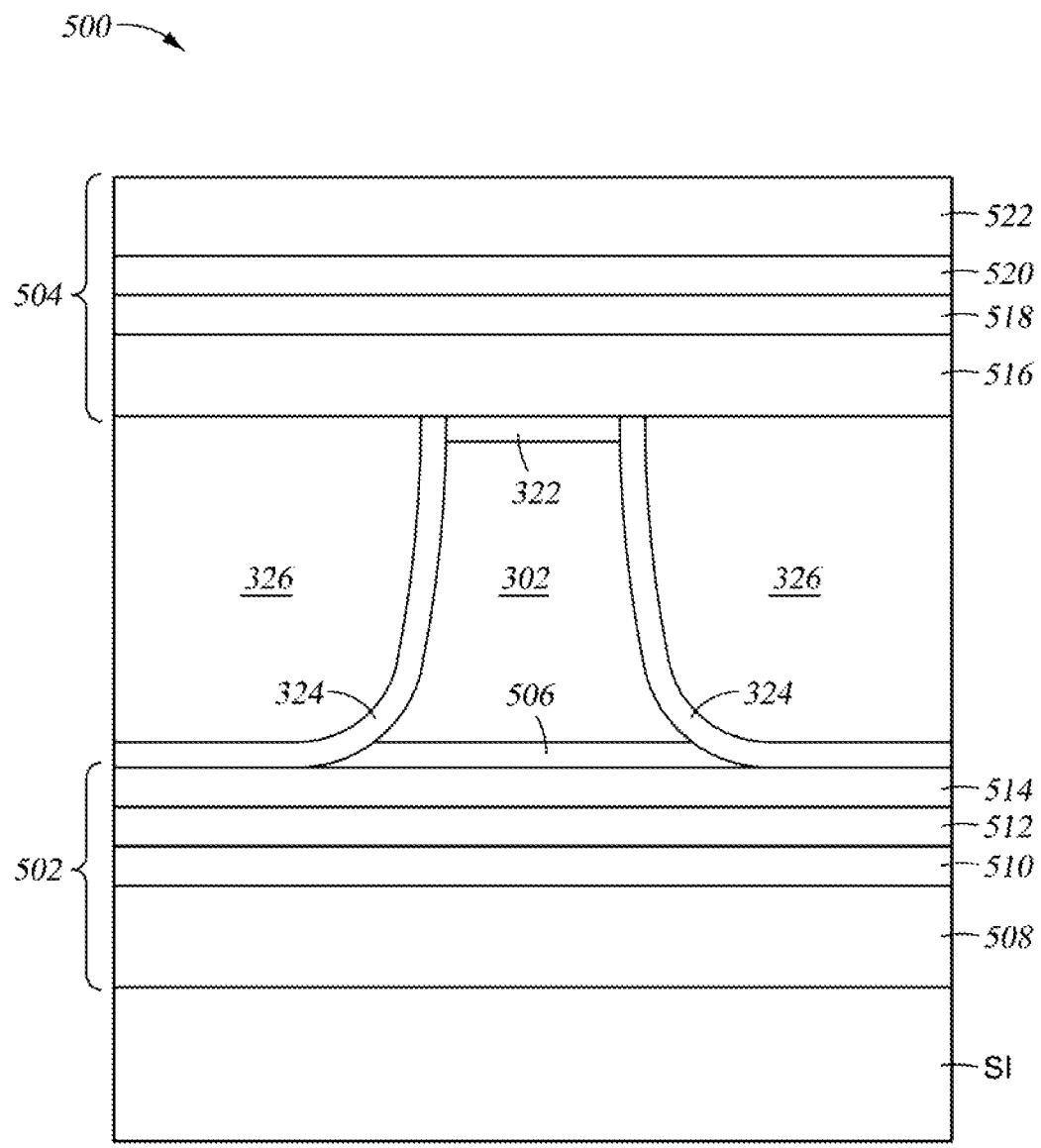
FIG. 5 is a cross sectional bottom view of a magnetic read head according to embodiments described herein.

To further improve the stability of the magnetic read head, laminated shields may be disposed over and under the sensor stack and the side shields. The performance of the side shields is improved when one laminated shield is coupled, or directly contacting the side shields. FIGS. 5-9 illustrate a magnetic read head having laminated shields over and under the sensor stack. FIG. 5 is a cross sectional bottom view of a magnetic read head 500 according to embodiments described herein. As shown in FIG. 5, the sensor stack 302 and the side shields 326 may be disposed over a first laminated, or multilayer shield 502, which is disposed over the sensor shield Sl. A second laminated shield 504 may be disposed over the sensor stack 302 and the side shields 326. The first laminated shield 502 may be separate from the side shields 326 by insulating layers 324 and may be separated from the sensor stack 302 by insulating metallic seed layer 506. The metallic seed layer 506 may comprise Ta/Ru. The second laminated shield 504 may be separated from the sensor stack 302 by the capping layer 322, but the second laminated shield 504 may be coupled to the side shields 326.

The first laminated shield 502 may include an antiferromagnetic layer 508 with Ta, Ru, Ta/Ru, or a metallic seed to break exchange, a first magnetic layer 510, a nonmagnetic layer 512 and a second magnetic layer 514. In one embodiment, the antiferromagnetic layer 508 comprises IrMn with a metallic seed, the first magnetic layer 510 comprises NiFe, the nonmagnetic layer 512 comprises Ru and the second magnetic layer 514 comprises NiFe. In one embodiment, the antiferromagnetic layer 508 with a metallic seed is disposed on the sensor shield Sl, the first magnetic layer 510 is disposed on the antiferromagnetic layer 508, the nonmagnetic layer 512 is disposed on the first magnetic layer 510, the second magnetic layer 514 is disposed on the nonmagnetic layer 512, and the insulating layer 324 and the metallic seed layer 506 are disposed on the second magnetic layer 514.

The second laminated shield 504 may include an antiferromagnetic layer 522, a first magnetic layer 520, a nonmagnetic layer 518 and a second magnetic layer 516. In one embodiment, the antiferromagnetic layer 522 comprises IrMn, the first magnetic layer 520 comprises NiFe, the nonmagnetic layer 518 comprises Ru and the second magnetic layer 516 comprises NiFe. In one embodiment, the antiferromagnetic layer 522 is disposed on the first magnetic layer 520, the first magnetic layer 520 is disposed on the nonmagnetic layer 518, the nonmagnetic layer 518 is disposed on the second magnetic layer 516, and second magnetic layer 516 is disposed on the side shields 326 and the capping layer 322.

Figure 6:
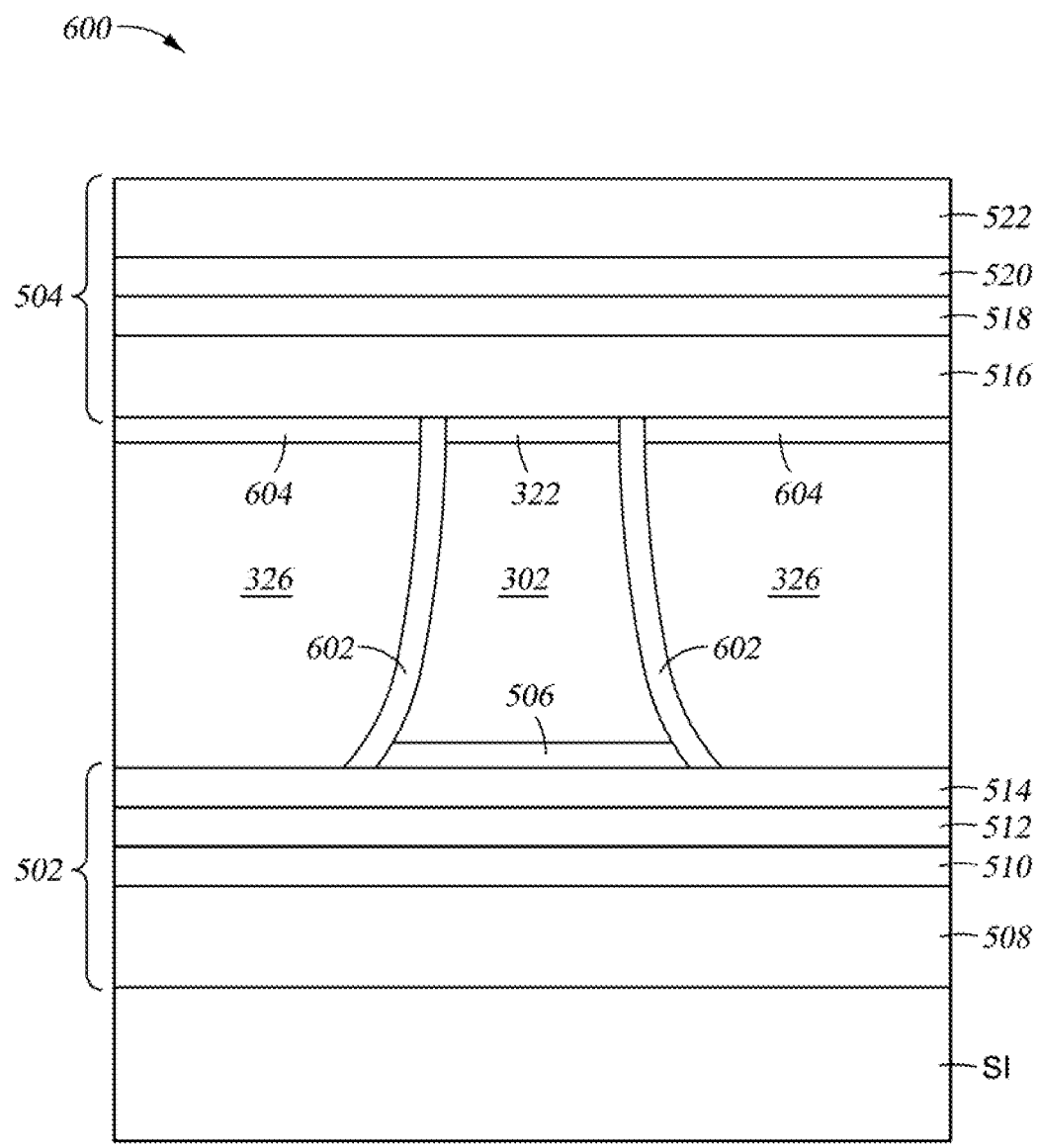
FIG. 6 is a cross sectional bottom view of a magnetic read head according to embodiments described herein.

FIG. 6 is a cross sectional bottom view of a magnetic read head 600 according to embodiments described herein. The magnetic read head 600 may include the first laminate shield 502 and the second laminate shield 504. Instead of coupling the second laminated shield 504 to the side shields 326, as shown in FIG. 5, the first laminated shield 502 is coupled to the side shields 326, and the second laminated shield 504 is separated from the side shields 326 by nonmagnetic layer 604. The nonmagnetic layer 604 may be disposed between the second laminated shield 504 and the side shields 326 and may comprise the same material as the insulating layer 324 or a nonmagnetic metallic material. The side shields 326 are separated from the sensor stack 302 by an insulating layer 602, and the insulating layer 602 may comprise the same material as the insulating layer 324. In one embodiment, the side shields 326 and the metallic seed layer 506 may be disposed on the second magnetic layer 514 of the first laminated shield 502, and the second magnetic layer 516 of the second laminated shield 504 may be disposed on the nonmagnetic layer 604 and the capping layer 322. FIGS. 5-6 show only one of the two laminated shields is coupled to the side shields, which improves shielding performance.

Figure 7:
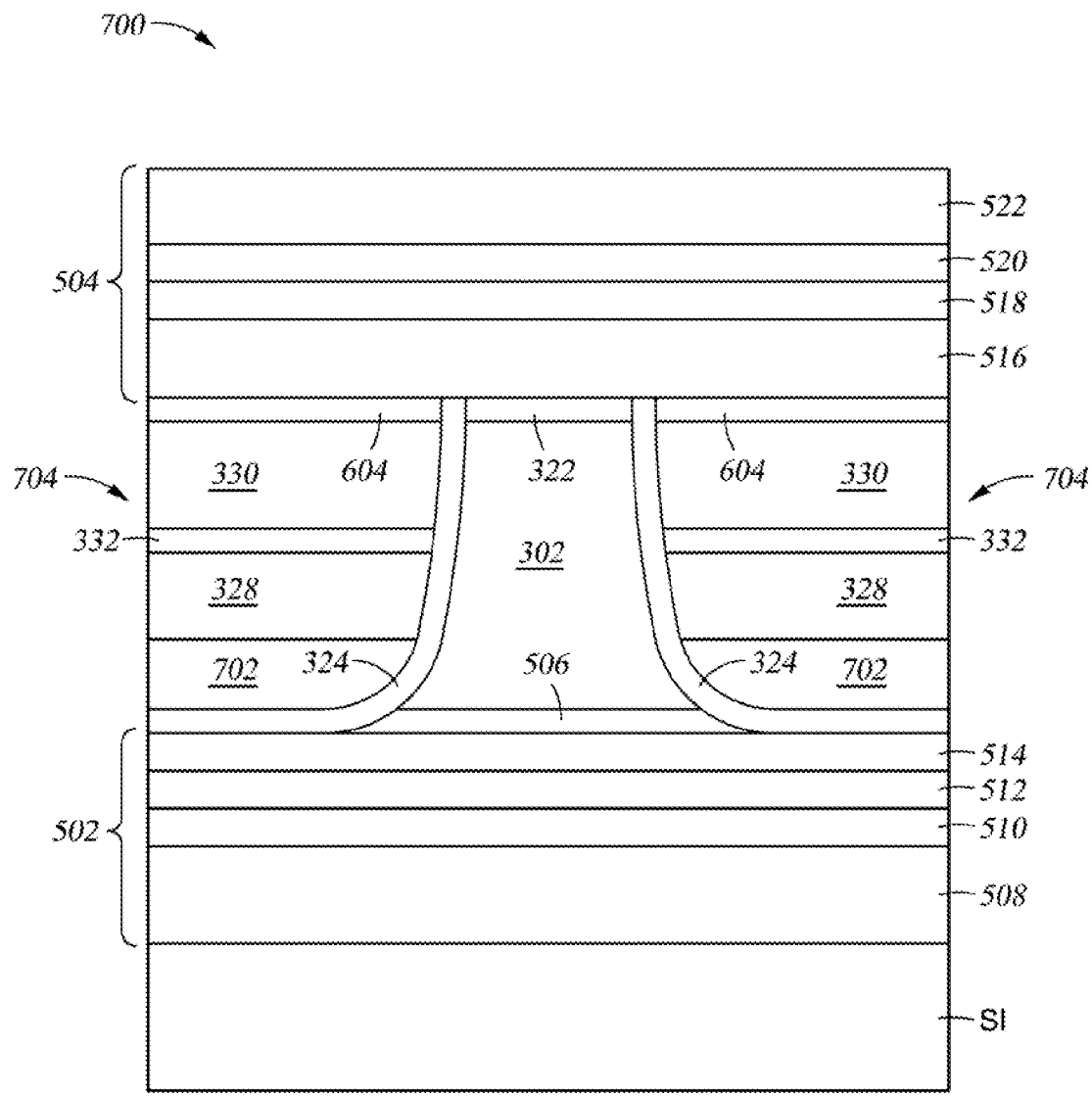
FIG. 7 is a cross sectional bottom view of a magnetic read head according to embodiments described herein.
Figure 8:
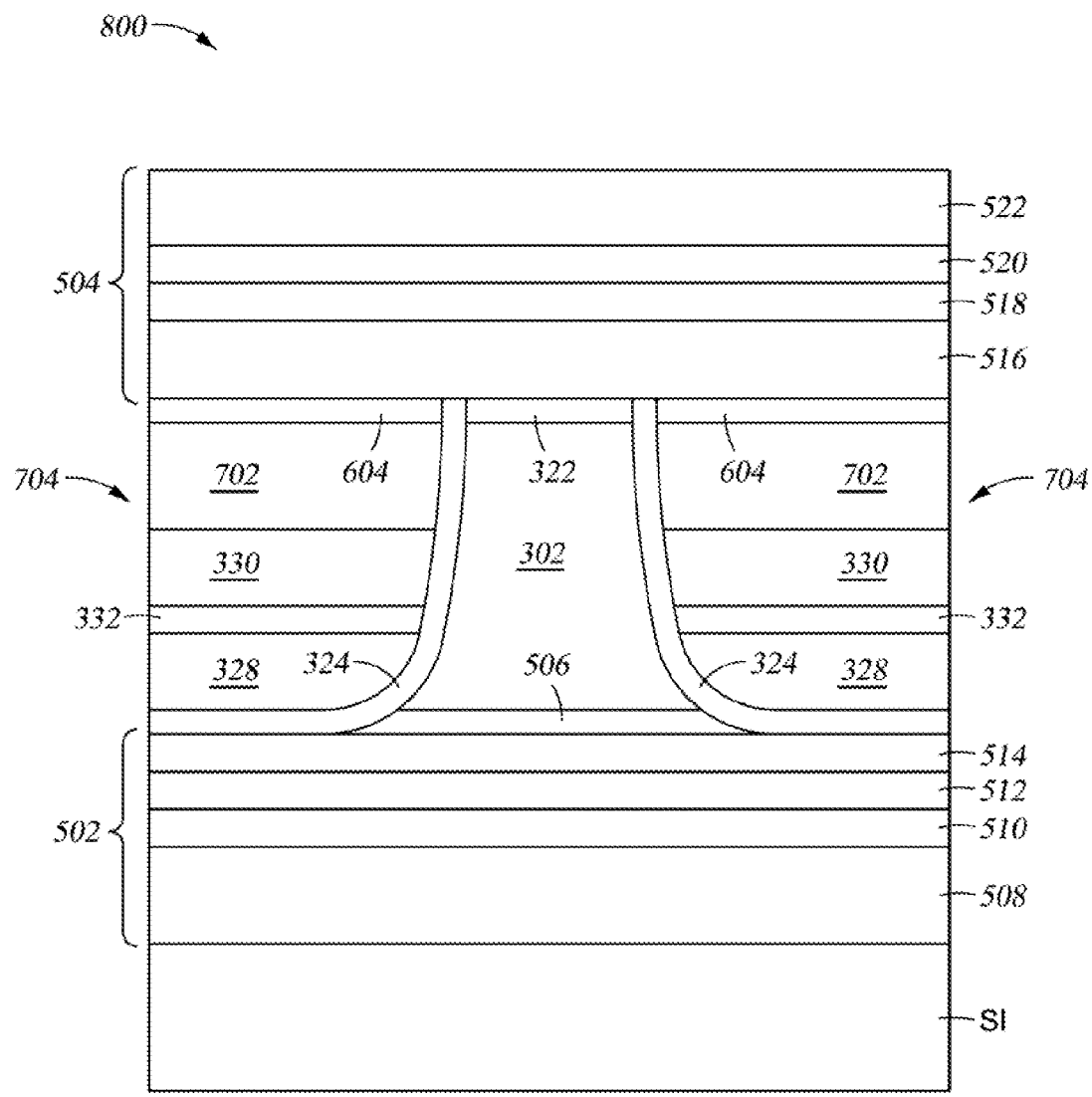
FIG. 8 is a cross sectional bottom view of a magnetic read head according to embodiments described herein.

FIGS. 7-8 illustrate a magnetic head having both first and second laminated shields separated from the side shields and an additional antiferromagnetic layer is included in each of the side shields. The antiferromagnetic layer in the side shield introduces a unidirectional anisotropy to the side shield, which helps improve the performance of the side shields. FIG. 7 is a cross sectional bottom view of a magnetic read head 700 according to embodiments described herein. As shown in FIG. 7, both first and second laminated shields 502, 504 are separated from the side shields 704 by the insulating layer 324 and the nonmagnetic layer 604. The side shields 704 may include the first magnetic layer 328, the second magnetic layer 330, the nonmagnetic layer 332, and an antiferromagnetic layer 702. The antiferromagnetic layer 702 may be disposed between the first magnetic layer 328 and the insulating layer 324, as shown in FIG. 7, or disposed between the nonmagnetic layer 604 and the second magnetic layer 330 in a magnetic read head 800 as shown in FIG. 8.

Figure 9A:
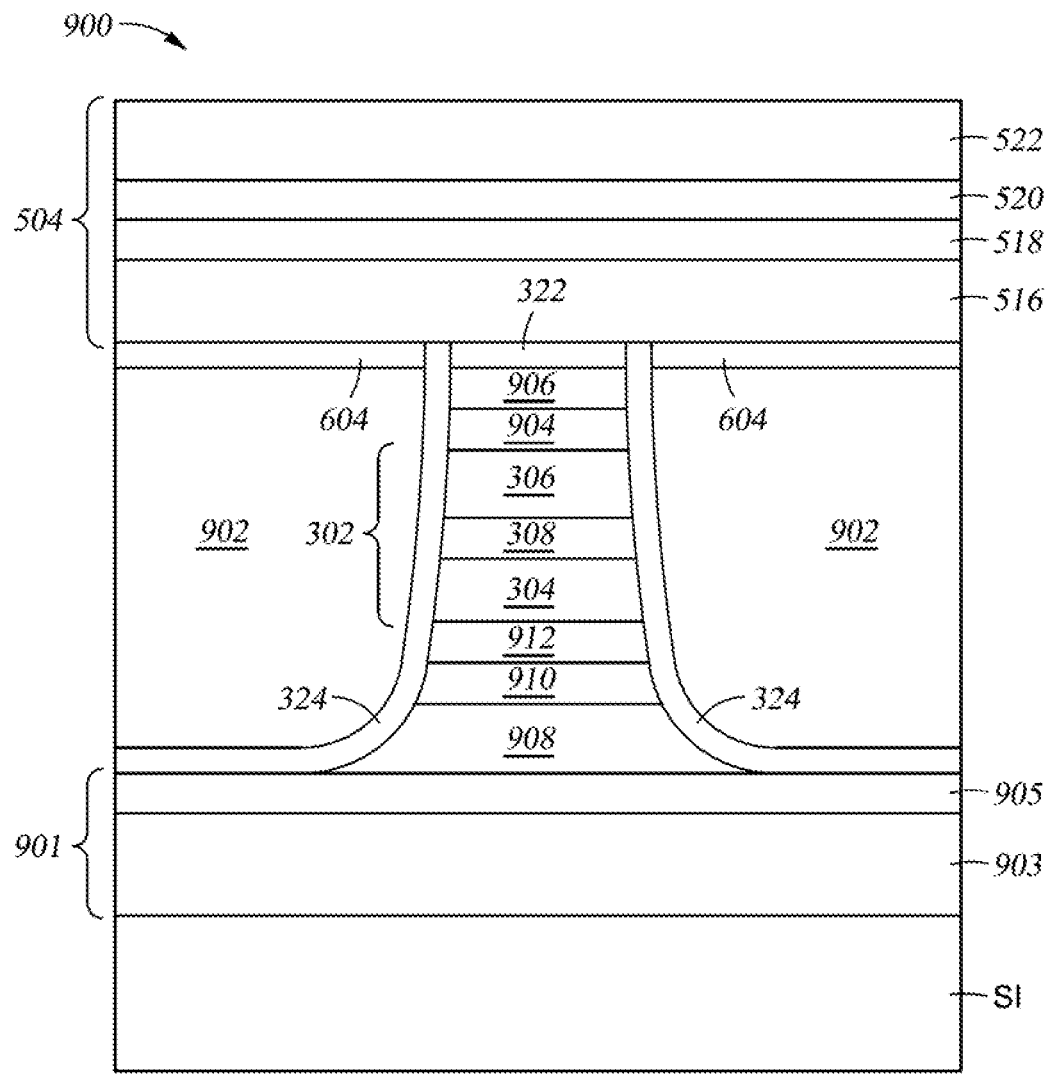
FIGS. 9A-9B are cross sectional bottom views of a magnetic read head according to embodiments described herein.
Figure 9B:
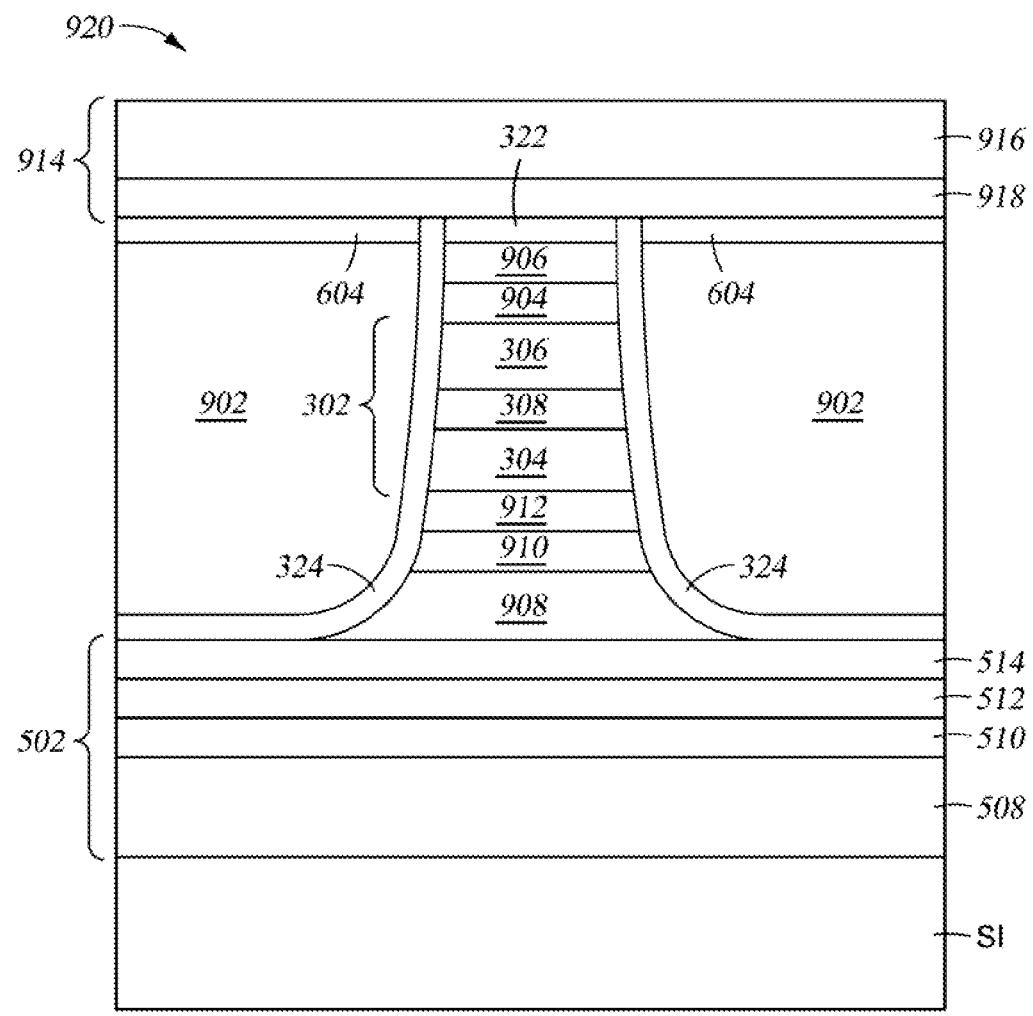

FIG. 5-8 illustrate a magnetic read head including SAF structures as side shields. FIGS. 9A-9B illustrate a magnetic read head that does not include side shields. Instead, the dielectric material extends all the way to the MFS. FIG. 9A is a cross sectional bottom view of a magnetic read head 900 according to embodiments described herein. The magnetic read head 900 may include a bottom shield 901 having an antiferromagnetic layer 903 with a Ta, Ru, Ta/Ru, or a metallic seed layer (not shown) to break exchange, and a magnetic layer 905. In one embodiment, the antiferromagnetic layer 903 comprises IrMn with a metallic seed layer, and the magnetic layer 905 comprises NiFe. The magnetic read head 900 may include a second magnetic layer 908 disposed over a portion of the magnetic layer 905. In one embodiment, the second magnetic layer 908 comprises NiFe. A nonmagnetic layer 910 may be disposed on the second magnetic layer 908. The nonmagnetic layer 910 may be a thin Ru layer having a thickness about the third anti-parallel (AP) coupling peak (about 20 Angstroms) such that the second magnetic layer 908 is weakly coupled to the first magnetic free layer 304, providing a longitudinal stabilization to the sensor stack 302. Alternatively, a nonmagnetic spacer layer 912 is disposed on the nonmagnetic layer 910 and the total thickness of the layers 910, 912 is over 30 Angstroms, so only magnetostatic bias is provided to the first magnetic free layer 304.

The magnetic read head 900 may also include a nonmagnetic layer 904 disposed on the sensor stack 302, a magnetic layer 906 disposed on the nonmagnetic layer 904. Similarly to the nonmagnetic layer 910, the nonmagnetic layer 904 may be a thin Ru layer only for direct AP coupling. Alternatively, a nonmagnetic spacer layer (not shown) may be disposed below the nonmagnetic layer 904 to provide magnetostatic bias to the second magnetic free layer 306. The nonmagnetic layer 904, the magnetic layer 906, the sensor stack 302, the magnetic layer 908, the nonmagnetic layer 910 and the nonmagnetic spacer layer 912 may be laterally bookended by a dielectric material 902. The dielectric material 902 may comprise the same material as the dielectric material 338. In this configuration, either magnetostatic bias or AP bias is provided to the free layers 304, 306 to achieve improved signal to noise ratio and improved stability. The second laminated shield 504 may be disposed over the sensor stack 302 and the dielectric material 902.

FIG. 9B is a cross sectional bottom view of a magnetic read head 920 according to embodiments described herein. The magnetic read head 920 includes the first laminated shield 502 disposed under the sensor stack 302 and the dielectric material 902. The second laminated shield 504 shown in FIG. 9A is replaced with an antiferromagnetic layer 916 and a magnetic layer 918. The antiferromagnetic layer 916 may comprise the same material as the antiferromagnetic layer 903 and the magnetic layer 918 may comprise the same material as the magnetic layer 905. A metallic seed (not shown) may be disposed on the antiferromagnetic layer 916 to break exchange.

In summary, a magnetic read head having side shields decoupled from the bias material is disclosed. The decoupled side shields and bias material helps reduce the disturbance to the bias material. To further improve the stability of the read head, laminated shields may be disposed over and under the sensor stack and the side shields.

While the foregoing is directed to embodiments, other and further embodiments of the disclosure may be devised without departing from the basic scope thereof, and the scope thereof is determined by the claims that follow.

What is claimed is:

1. A magnetic head, comprising:
   a sensor stack;
   side shields laterally bookending the sensor stack, wherein the side shields extend to a media facing surface, wherein the side shields each comprises an antiferromagnetic layer, a first magnetic layer, a second magnetic layer, and a nonmagnetic layer disposed between the first and second magnetic layers;
   a first multilayer shield disposed under the sensor stack and the side shields;
   a sensor shield disposed under the first multilayer shield;
   a second multilayer shield disposed over the sensor stack and the side shields;
   a first insulating layer disposed between the first multilayer shield and the side shields; and
   a second insulating layer disposed between the second multilayer shield and the side shields.

2. The magnetic head of claim 1, wherein the antiferromagnetic layer is disposed adjacent the first magnetic layer.

3. The magnetic head of claim 1, wherein the antiferromagnetic layer is disposed adjacent the second magnetic layer.

4. A magnetic head, comprising:
   a sensor stack;
   a dielectric material laterally bookending the sensor stack, wherein the dielectric material extends to a media facing surface;
   a first multilayer shield disposed under the sensor stack and the dielectric material;
   a sensor shield disposed under the first multilayer shield;
   a second multilayer shield disposed over the sensor stack and the dielectric material; and
   two insulating layers each disposed between the dielectric material and the sensor stack, wherein the two insulating layers are distinct from the dielectric material.

5. The magnetic head of claim 4, wherein the first and second multilayer shields each comprises an antiferromagnetic layer and a first magnetic layer.

6. The magnetic head of claim 5, wherein the first or second multilayer shields each further comprises a second magnetic layer and a nonmagnetic layer.

7. A magnetic head, comprising:
   a sensor stack;
   a dielectric material laterally bookending the sensor stack, wherein the dielectric material extends to a media facing surface;
   a first multilayer shield disposed under the sensor stack and the dielectric material;
   a sensor shield disposed under the first multilayer shield;
   a second multilayer shield disposed over the sensor stack and the dielectric material; and
   a first nonmagnetic layer and a first magnetic layer disposed over the sensor stack, wherein the first nonmagnetic layer and the first magnetic layer are laterally bookended by the dielectric material.

8. The magnetic head of claim 7, further comprising a second nonmagnetic layer and a second magnetic layer disposed under the sensor stack, wherein the second nonmagnetic layer and the second magnetic layer are laterally bookended by the dielectric material.

* * * * *

UNITED STATES PATENT AND TRADEMARK OFFICE
CERTIFICATE OF CORRECTION

PATENT NO.        : 9,230,576 B1
APPLICATION NO.   : 14/479767
DATED             : January 5, 2016
INVENTOR(S)       : Gill et al.

It is certified that error appears in the above-identified patent and that said Letters Patent is hereby corrected as shown below:

Specification

In the Detailed Description;

Column 5, Line 56, please delete "Sl" and insert --S1-- therefor;

Column 6, Line 31, please delete "Si" and insert --S1-- therefor;

Column 7, Line 53, please delete "Sl" and insert --S1-- therefor;

Column 8, Line 5, please delete "Sl" and insert --S1-- therefor.

Signed and Sealed this
Nineteenth Day of April, 2016

Michelle K. Lee
*Director of the United States Patent and Trademark Office*